US012657092B1

(12) United States Patent
Ramesh et al.

(10) Patent No.: US 12,657,092 B1
(45) Date of Patent: Jun. 16, 2026

(54) DISTRIBUTED SHARED LOGGING IN A CLUSTER NETWORK WITH MULTIPLE SEGMENT ALLOCATION AND SEGMENT COMPACTION

(71) Applicant: Dell Products L.P., Round Rock, TX (US)

(72) Inventors: Deepa Ramesh, Cupertino, CA (US); George Mathew, Belmont, CA (US); Neeraj Bhutani, Dublin, CA (US); Abhinav Duggal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/038,386

(22) Filed: Jan. 27, 2025

(51) Int. Cl.
*G06F 11/14* (2026.01)
*G06F 11/1446* (2026.01)

(52) U.S. Cl.
CPC ...... *G06F 11/1464* (2013.01); *G06F 11/1453* (2013.01); *G06F 11/1469* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2018/0107562 A1* | 4/2018 | Goodman | ........... | G06F 11/1451 |
| 2024/0037069 A1* | 2/2024 | Mathew | .............. | H04L 61/4511 |
| 2025/0245127 A1* | 7/2025 | Shilane | ................. | G06F 11/364 |
| 2025/0335282 A1* | 10/2025 | Tiwary | ................. | G06F 11/323 |

* cited by examiner

*Primary Examiner* — Eddy Cheung
(74) *Attorney, Agent, or Firm* — Staniford Tomita LLP

(57) ABSTRACT

A distributed logging system for different components in a cluster network system. A distributed log has a shared storage architecture and provides durability by maintaining multiple copies of the log data, and availability is facilitated through a sealing protocol that ensures that system failure will result in reconfiguration with a new node. The distributed log is fault tolerant so that a loss of a node will not lose data. A consensus algorithm is used for different clients to propose commands to the leader of the consensus engine, and the leader chooses the commands for each log slot. The log is replicated by the leader to all the followers and the protocol ensures that no loss of any committed entries when the new leader takes over.

20 Claims, 10 Drawing Sheets

400

200

202

203

300

400

Client
Log1    Log2
Client Library

Client
Log3    Log4
Client Library

Client
Log5    Log6
Client Library

402

404

Sequencer
412 data blob
405

Metastore
etcd
410

Tiering old
segments

Object
Scale
414

Log Server 1

Log Server 2

Log Server 3

406

408   NVMe SSD

416
Segments on
NVMe SSD

Node 1      Node 2      Node 3

500

700

701

702    704

Log1    Segment 1

Segment 2

Node 1

Log2    Segment 3

Segment 4

Node 2

709    Segment 5

Logn    Segment 6

Node 3

800

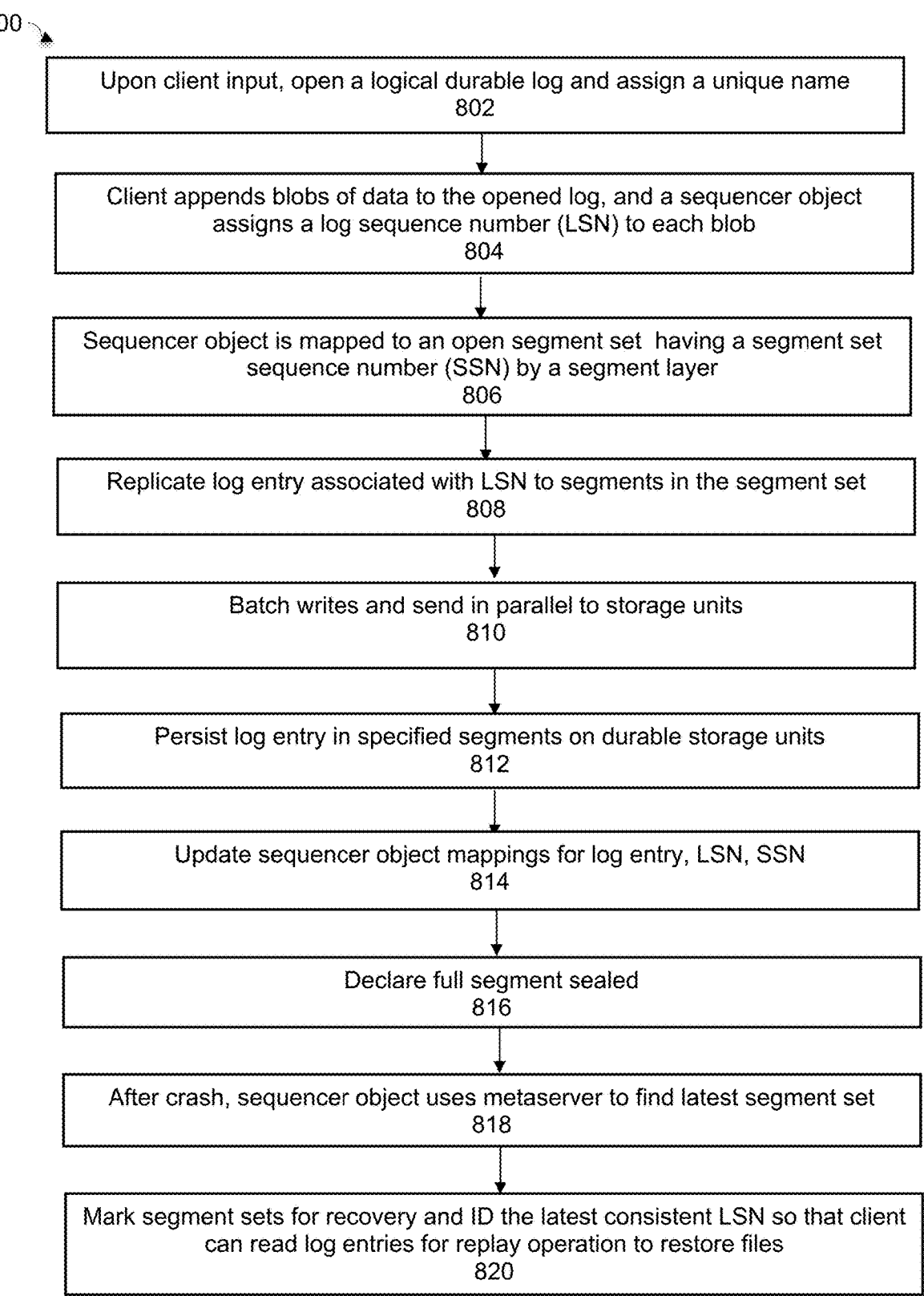

Upon client input, open a logical durable log and assign a unique name
802

Client appends blobs of data to the opened log, and a sequencer object
assigns a log sequence number (LSN) to each blob
804

Sequencer object is mapped to an open segment set having a segment set
sequence number (SSN) by a segment layer
806

Replicate log entry associated with LSN to segments in the segment set
808

Batch writes and send in parallel to storage units
810

Persist log entry in specified segments on durable storage units
812

Update sequencer object mappings for log entry, LSN, SSN
814

Declare full segment sealed
816

After crash, sequencer object uses metaserver to find latest segment set
818

Mark segment sets for recovery and ID the latest consistent LSN so that client
can read log entries for replay operation to restore files
820

LOG OPEN

902

LOG APPEND
- client log
- client library
- log server
- metastore server

904

LOG READ
- client log
- client library
- log server
- metastore server

906

LOG TRUNCATE
- client log
- client library
- log server
- metastore server

908

CRASH RECOVERY
- client
- log server
- metastore
- etcd

910

LOG MIGRATION

912

1

DISTRIBUTED SHARED LOGGING IN A CLUSTER NETWORK WITH MULTIPLE SEGMENT ALLOCATION AND SEGMENT COMPACTION

TECHNICAL FIELD

Embodiments are directed to log processing in large-scale networks, and to a distributed consistent shared logging platform to support thousands of logs with independent sequencers.

BACKGROUND

A distributed (or cluster) filesystem is a type of file system in which data is spread across multiple storage devices as may be provided in a cluster of nodes. Each computer forms a node in the system and runs its own instance of an operating system. The file system is shared by being simultaneously mounted on multiple servers. This type of distributed file system can present a global namespace to the nodes so that files appear to be in the same central location. Distributed file systems are typically very large and may contain many hundreds of thousands or even many millions of files, as well as services (applications) that use and produce data. The Santorini file system represents a type of cluster network system that stores the file system metadata on a distributed key value store and the file data on object store. The file/namespace metadata can be accessed by any front end node, and any file can be opened for read/write by any front end node.

Responding to client needs due to fault conditions or crashes is an important function of any storage system. In a single node system, this can be as simple as caching the latest I/O operations before flushing to disk for analysis, and using resources like NVRAM (non-volatile RAM) to speed the I/O. Such a process does not scale for cluster systems, however since there can be many caches for the different nodes. Furthermore, the latest I/O information comprises relevant user and system information that is usually captured and provided in the form of logs that record operations performed by the system components (e.g., nodes, pods, services, interfaces, etc.) in log files. In large scale cluster executing several applications or services, the type and number of log files can be significantly large.

In order to hold transactions for different components in a distributed system, some form of abstraction for a shared log is typically required. Support must also be provided for strictly serializable transactions and low latency highly available and linearizable objects for the shared log. An example of such a system is the microservice-based distributed Data Domain File System (DDFS), which requires a robust logging mechanism. The components that comprise the DDFS generate and consume upwards of thousands of logs with independent sequencers. The components require a low latency, highly available, interface with a strictly serializable transaction interface for write and read operations. Additionally, the write and read operations must support ingest of several streams of backup data matching the performance requirements of the DDFS system. The logging mechanism is typically constrained by the compute and storage resources available in the system, but must still provide the perception of infinite space for the components in the system. High availability for DDFS components is measured in terms of number of failures to tolerate (FTT), and different components have different requirements for FTT.

Present distributed logging solutions are not optimized for writes (appends). Reads are generally optimized, though random reads may be a challenge. These present systems rely on single sequencers to support multiple writes to the individual logs. As a result, they do not provide adequate performance for modern networks, such as DDFS, which relies heavily on writes being optimized.

What is needed, therefore, is a logging platform with highly available in-memory data structures supporting strictly serializable transactions, highly optimized for appends across several thousand logs within the resource constraints of the system. What is further needed is high availability, such as that provided by supporting configurable FTT values for every component that uses the logging platform.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and Data Domain are trademarks of Dell Technologies, Inc.

BRIEF SUMMARY OF EMBODIMENTS

Embodiments are described for a distributed logging system for different components in a cluster network system. Certain processing components provide support for providing logging without any apparent space restrictions for users, the ability to easily lookup data, and make replicas of the logs for loss prevention.

A cluster network system has a distributed log featuring a shared storage architecture and is unique over present distributed log systems in the way that it separates out durability from availability. The durability is maintained by maintaining multiple copies of the log data, and availability is maintained by a sealing protocol that ensures that a failure of a node or the client will result in reconfiguration with a new client or node continuing on from where the previous client or node left off. The distributed log is a log that is fault tolerant so that a loss of a node will not lose data. Embodiments implement a consensus algorithm in which different clients propose commands to the leader of the consensus engine, and the leader chooses the commands for each log slot. The log is replicated by the leader to all the followers and the protocol ensures that no loss of any committed entries when the new leader takes over.

Each node has a distributed log server running which is responsible for writing/reading from local storage on that node. The distributed log clients have a client library that maps user logs to their locations in storage. Each log is mapped to the distributed log client library component through a sequencer. The distributed log uses NVMe SSDs for storage and each node contributes storage towards a pool. A metastore component is used to maintain this information. The metastore is a key value store that uses a stateless service and etcd as a backing storage for storing per node storage information and mapping of logs to their locations in storage.

This system supports several functions, such as fault isolation and tolerance, multiple segment allocation techniques and segment compaction, crash recovery with restoration consistency, and tiering of old segments to object storage to avoid garbage collection and its impact on SSD endurance.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 8 is a flowchart that illustrates a process flow for an append (write) workflow from a client, under some embodiments.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a distributed, consistent, and shared logging platform to support thousands of logs with independent sequencers exposing a transaction based write and read interface to clients, and with the ability to tolerate a number (n) failures using n+1 replicas.

Figure 1:
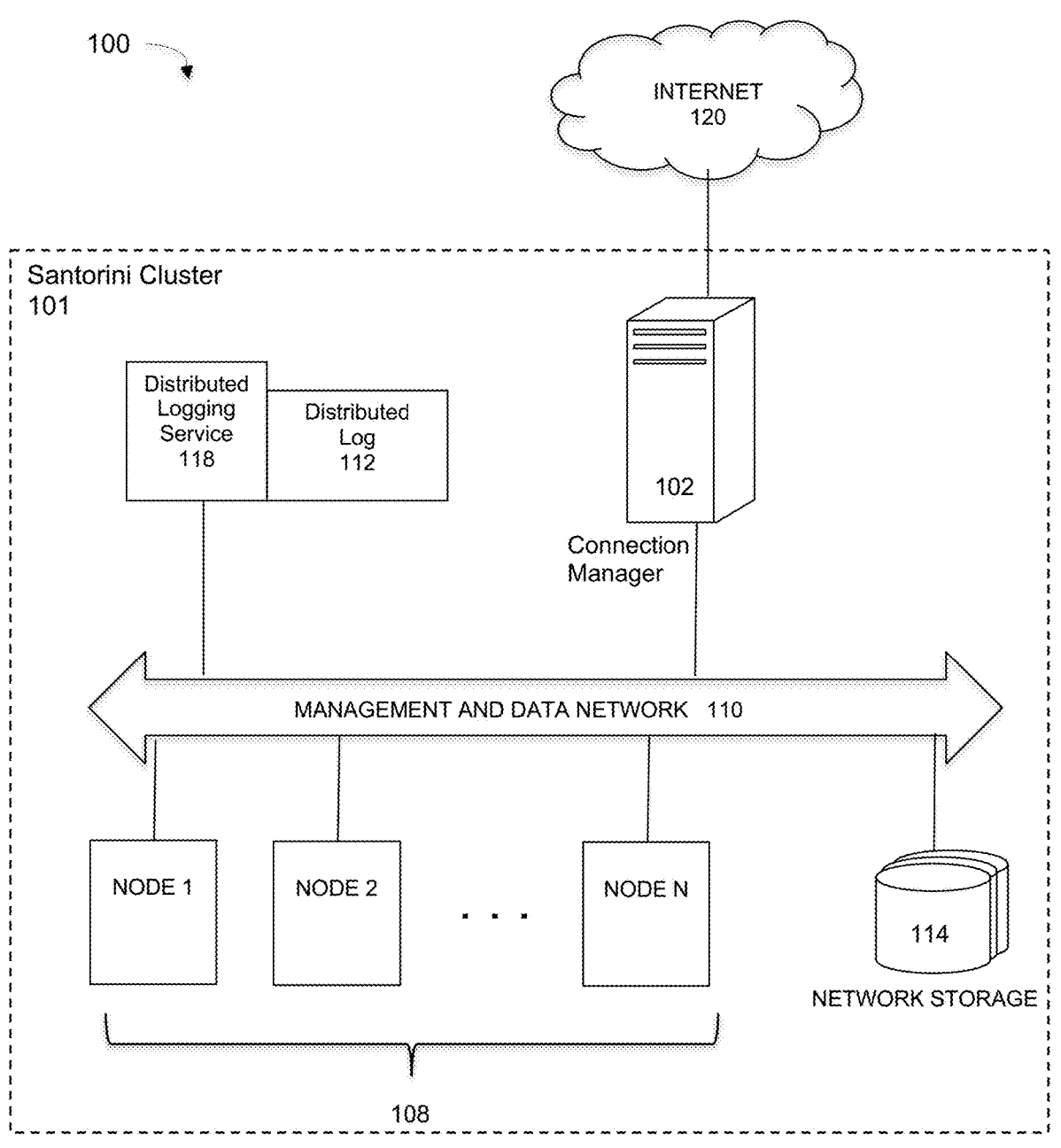
FIG. 1 is a block diagram of illustrating a distributed system implementing comprehensive logging for cluster networks, under some embodiments.

FIG. 1 is a block diagram illustrating a distributed system implementing distributed logging for cluster networks, under some embodiments. System 100 comprises a large-scale network that includes a cluster network 101 having a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system 101 (also referred to as a cluster or clustered system) typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and a connection manager 102 through network 110. The connection manager can control automatic failover for high-availability clusters, monitor client connections and direct requests to appropriate servers, act as a proxy, prioritize connections, and other similar tasks.

In an embodiment, cluster network 101 may be implemented as a Santorini cluster that supports applications such as a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components. The data backup system may comprise a Data Domain system, in which case network 101 supports various related filesystem and data managers, such as PowerProtect Data Manager (PPDM), as well as services such as ObjectScale object storage and other services.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell Technologies, Inc.

Although embodiments are described in the context of Data Domain filesystem (DDFS) and a Santorini cluster system, embodiments are not so limited and any architecture that requires a distributed logging service within given, configurable resources may be used.

Cluster network 101 includes a network 110 and also provides connectivity to other systems and components, such Internet 120 connectivity. The networks may be implemented using protocols such as Transmission Control Protocol (TCP) and/or Internet Protocol (IP), well known in the relevant arts. In a cloud computing environment, the applications, servers and data are maintained and provided through a centralized cloud computing platform.

As shown in FIG. 1, network 101 includes a distributed logging service 118 and shared distributed log data structure 112 (referred to as the 'distributed log') to facilitate the generation and processing of logs and log files for users, components, applications, and so on. Process 112 may be a process executed by a specialized node as a specially configured management or control node in system 100. Alternatively, it may be executed as a server process, such as by server 102 or any other server or client computer in the system.

In an embodiment, cluster network 101 implements containerization technology through a Kubernetes implementation. A container is a virtualized computing environment to run an application program as a service or microservice, and are lightweight, portable data constructs that are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

In an embodiment, system 100 uses Kubernetes as an orchestration framework for clustering the nodes 1 to N in FIG. 1. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and the well-established Docker program deploys containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel.

In Kubernetes, a pod is the smallest deployable data unit that can be created and managed. A pod is a group of one or more containers, with shared storage and resource requirements. Pods are generally ephemeral entities, and when created, are scheduled to run on a node in the cluster. The pod remains on that node until the pod finishes execution.

In an embodiment, the support bundle process 112 is used in a clustered network that implements Kubernetes clusters. One such example network is the Santorini system or architecture, though other similar systems are also possible.

Figure 2:
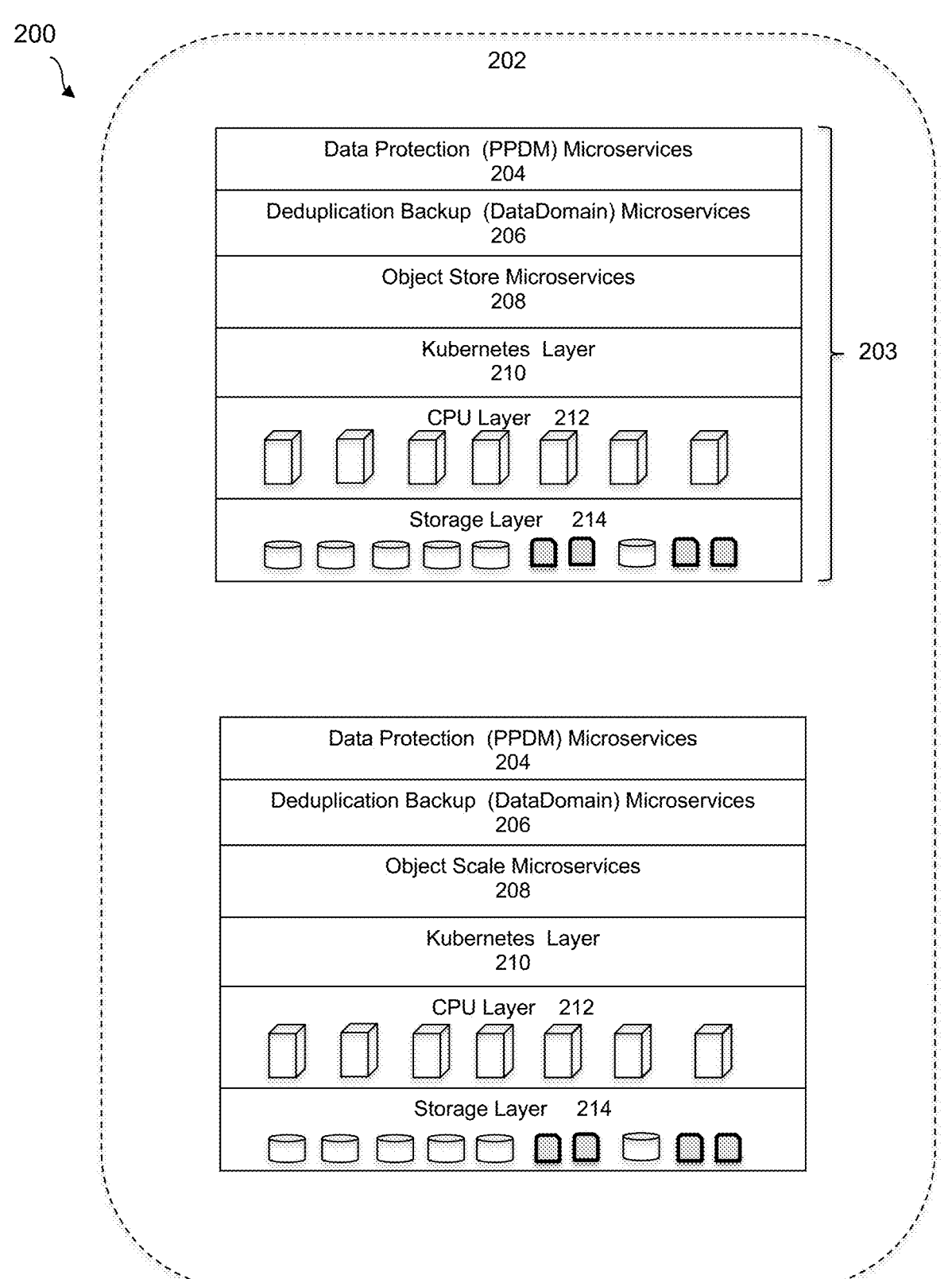
FIG. 2 illustrates a high-level overview of a network cluster using the Santorini architecture, under some embodiments.

FIG. 2 illustrates a high-level overview of a network cluster using the Santorini architecture, under some embodiments. In system 200 of FIG. 2, a two-node cluster 202 is shown. Each node 203 consists of several distinct components or processing layers. For the example shown, a node includes a PowerProtect Data Manager (PPDM), or similar microservices layer 203, a Data Domain (deduplication backup) appliance microservices layer 206, an object storage (e.g., Dell ObjectScale) microservices layer 208, a Kubernetes layer 210, a processor layer 212, and a storage layer 214 including different types of storage media, such as HDD, Flash memory, SSD memory, and so on. Each of these component products consists of multiple microservices, and as more nodes are added, Santorini scales CPU, storage, RAM, and networking accordingly. Other layers can also be included, and a cluster 202 may comprise any practical number of nodes 203. The PPDM represents a cloud-native data protection manager system, and ObjectScale represents a scalable object storage manager.

As shown in FIG. 2, embodiments of the cluster network 200 through DD microservices 206 utilize Data Domain backup appliances to provide streaming deduplication, and which use the Data Domain File System (DDFS) as an inline data deduplication filesystem. As data gets written to the filesystem, DDFS creates variable sized segments and writes the unique segments to a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated filesystem that forms segments from data, these segments are uniquely identified by their key/label called a 'fingerprint.' Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

With respect to the directory tree structure of the data processed in system 100, various different data structures can be supported by the file system (e.g., DDFS or Santorini filesystem). A B+ Tree is self-balancing tree structure and is a variant of a standard B Tree, and Each file inode is stored in the B+ Tree as a data blob using the parent directory inode number and the child file inode number as the key. A B+ Tree key structure composed of the parent directory inode as the primary key and child file inode as the secondary key to construct the full key. An Mtree is a tree data structure similar to a B+ Tree (or R-tree), which is constructed using a metric and relies on triangle inequality for efficient range and k-nearest neighbor queries. As with other tree-based data structures, the Mtree is composed of nodes and leaves. In each node there is a data object that identifies it uniquely and a pointer to a sub-tree where its children reside. Every leaf has several data objects A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

A Data Domain or similar system can efficiently copy an existing file using the same underlying Merkle tree. It creates the new file with a new name, and therefore a new L6 root of the tree, but that tree then references the identical LP chunks. As this operation involves only the root of the tree, it is trivially fast and does not increase physical space in use beyond the one chunk containing the L6.

In an embodiment, the PPDM (PowerProtect Data Manager) microservices layer 204 builds on the Data Domain system 206 to provide data protection capabilities for VM image backups and Kubernetes workloads.

Upon creation of an Mtree, it can identify the domain on which the Mtree is created. All namespace metadata as well as the file data and metadata associated with a Mtree is allocated from resources owned by that domain. The Mtree names as well as Mtree IDs are unique across the cluster. Santorini exposes a global namespace that is a union of all namespaces in all domains.

Figure 3:
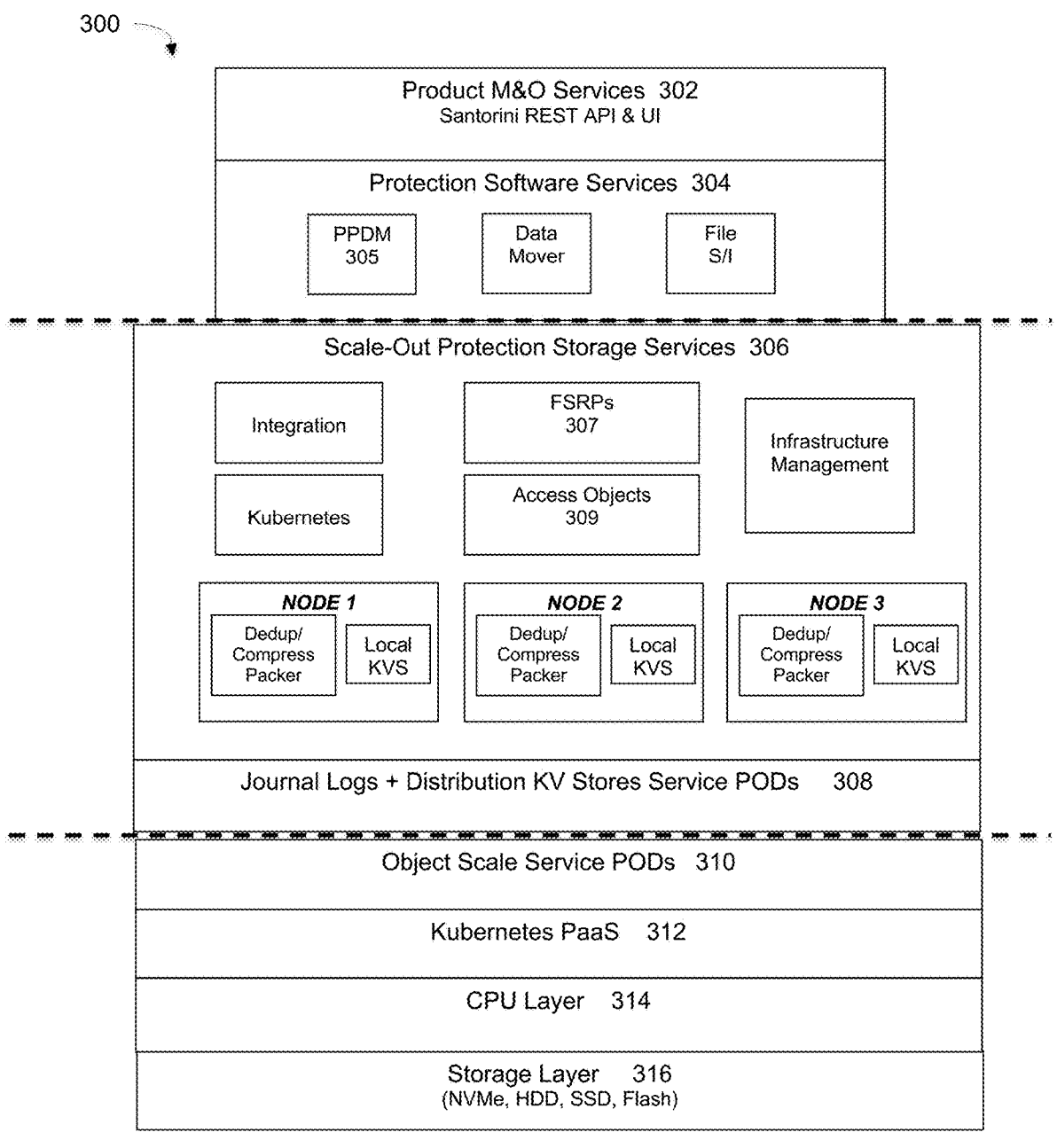
FIG. 3 illustrates details of the services related to the data path running in Santorini cluster network, under some embodiments.

FIG. 3 illustrates details of the services related to the data path running in Santorini cluster network, under some embodiments. As shown in diagram 300, a product services layer 302 provides the necessary REST APIs and user interface utilities. The API server implements a RESTful interface, allowing many different tools and libraries can readily communicate with it. A client called kubecfg is packaged along with the server-side tools and can be used from a local computer to interact with the Kubernetes cluster.

Below layer 302, the protection software services layer 304 includes a data manager (e.g., Power Protect Data Manager, PPDM) component 305 that provides backup software functionality. Within the scale-out protection storage services layer 306, the File System Redirection Proxy (FSRP) service 307 redirects file operations in a consistent manner based on the hash of a file handle, path, or other properties to instance of the access object service 309. The access object service 309 handles protocols and a content store manager. This means that files are segmented and the Lp tree is constructed by an access object 309. The FSRP

307 redirects file system accesses in a consistent way to the access objects 309 so that any in-memory state can be reused if a file is accessed repeatedly in a short time, and it avoids taking global locks.

Also included in this layer 306 are any number of nodes (e.g., Nodes 1 to 3, as shown), each containing a dedup/compression packer and a key-value (KV) store.

As an L1 is formed, a similarity group is calculated for the L1 based on the SHA1 fingerprints of the L0 segments (or other properties). The similarity group is checked against a mapping table, which leads to consistently routing the L1 based on its similarity group to an instance of a node's dedup/compress service. If similarity groups are in a range of 0-1023, then if there are four instances of the dedup/compress service, then the instances may uniquely be responsible for the ranges 0-255, 256-511, 512-767, 768-1023, though other mappings are possible. The dedup/compress instance will deduplicate the L0 segments relative to other fingerprints within the same similarity group. Other functionality exists in the dedup/compress service such as packing segments into compression regions, containers, and blobs that will be written to an underlying object storage such as provided by the object scale service layer 310, or an object store provided by the public cloud. Other layers of system 300 include a Kubernetes PaaS (platform as software) 312, a CPU layer 314, and a storage layer 316.

Distributed key value stores in 308 are also a component of Santorini and are used to hold much of the metadata such as the namespace Btree, the Lp tree, fingerprint index, and container fingerprints. These run as containers within the Santorini cluster and are stored to low latency media such as NVMe 316. There is also a distributed and durable log that replaces NVRAM for Santorini.

In an embodiment, NVMe (Non-Volatile Memory Express) devices are used for the storage layer 316 because of certain low latency performance benefits that are being made available for ever decreasing cost. NVMe is a protocol that uses a PCI Express (PCIe) bus to connect solid-state drive (SSD) storage to computers. It provides very high performance through parallel I/O operations with multicore processors, and communicates directly with the host CPU through multiple command queues (e.g., 64K). It features a latency of 2.8 microseconds and can presently perform over 1 million IOPS. The NVMe memory in storage layer 316 is used to store a high number of small transactions, such as log data. In present implementations, NVMe is on the order of 10,000 times as fast as hard disks (which do about 100 IOPs).

In general, Santorini is an integrated scale out software solution developed by Dell Technologies that can run on-premises or in a public cloud. In an embodiment, the Santorini stack consists of PPDM as backup software, Data Domain scale out filesystem, and Object Scale as a storage pool. PPDM, DD and object scale services are run as services inside the Kubernetes container infrastructure. The Santorini scale out filesystem consists of stateless independent DD services which are responsible for data path. The state of Santorini filesystem is maintained in three components as follows: data is put in object scale, metadata is stored in a distributed key value store (KVS), and logs are stored in a distributed log. The DDFS can use NVRAM, but for a Santorini system, NVMe SSD storage is used in place of NVRAM. The distributed log is built on top of these SSDs as a generic infrastructure for various logging requirements.

Distributed Log

In a cluster network, each component/product has many services, and often many different instances of each service.

Services may be started, stopped, and re-started, even on different nodes. The distributed logging service and infrastructure 118 is a journal log for data stored in the system. It essentially works as a distributed persistent cache to speed up writes coming into the system. This can be distinguished from other types of "logging" that may be performed for debugging purposes, but that are not related to the distributed log 112. For this embodiment, the distributed log or logs 112 are comprised of data cached by different components of the file system, such as the microservices layers 204, 206, and 208. The segmented logging infrastructure 118 allows these different journals to be written, accessed, independently in a fault tolerant, fast manner without space limitation in fixed sized logs.

Embodiments of system 100 of FIG. 1 use a distributed logging platform that provides horizontally scalable, fault tolerant logging infrastructure with a simple log interface for users. This log service can run as an independent set of microservices in the Santorini cluster. Such microservices would be used to implement, in system 400, the metaserver 410, log servers 406, NVMe storage 408, and the etcd backing store for the log metadata.

The distributed log service 118 provides a scalable, persistent, replicated and consistent log for components in Santorini. The log can run on any storage media (e.g., HDD, SSD), but is optimized for low latency storage media like NVMe SSDs. There are two use-cases of the distributed log in a Santorini filesystem. First, it replaces the NVRAM that is used by filesystem for persisting transaction logs and data writes. Second, it persists metadata in the write path as needed by the KVS.

At a high level, the distributed log 112 uses a shared storage architecture. The log pools all of the NVMe storage to create a storage pool and clients write to storage pool. The Non-Volatile Memory Express (NVMe) is a protocol that uses a PCI Express (PCIe) bus to connect solid-state drive (SSD) storage to computers. It provides very high performance through parallel I/O operations with multicore processors, and communicates directly with the host CPU through multiple command queues (e.g., 64K). At present, it features a latency of 2.8 microseconds and can perform over 1 million IOPS. Although traditionally a very expensive type of memory, costs are reducing over time. In an embodiment, the NVMe memory is used to store a high number of small transactions. NVMe is also about 10,000 times as fast as hard disks (which do about 100 IOPs), allowing storage of very many small objects (e.g., Key Value Pair data structures of individual inodes) and access them randomly with high performance.

In general, a log is the simplest storage abstraction which is append only and totally ordered. Databases and filesystems use logging to provide atomicity and durability of data structures in the presence of system crashes. They write the records/pages or changes to the pages in the log which acts as a history of changes. This is called an intent log in the context of file systems, as compared to a transaction log in the context of databases. Before performing an operation, a record of the intent to perform it is written to storage, such as hard disk (HDD). After the operation is performed, another record is written as an operation will usually change some data in a system. In some cases, the intent record will contain a copy of the data before and after the operation, which necessarily adds some processing overhead, as enough data must be written to the log to either redo or to undo the operation later. After a system event, the system uses the intent log to identify operations that were still in process during the failure and recover the data, usually by either undoing a partially completed operation, or by redoing any in process operation.

It is important to note that a log is not a file and does not provide any filesystem semantics. For example, there is no close, random read/write, or overwrite of a log.

Besides providing atomicity and durability, logs are also used as a fundamental building block for building distributed systems. Two general techniques of building distributed systems like state machine replication and primary backup replication rely on log as the building block. Logs are mirrored to multiple replicas, which help all replicas to apply the log entries in the same sequence.

A log is local to a single node, whereas a distributed log is fault tolerant and scalable. A distributed log has certain properties including the fact that a distributed log can handle F failures with F+1 copies, and it scales out as the number of nodes increase.

A distributed log has producers writing to and consumers reading from the log. In publisher-subscriber (pub-sub) messaging systems (e.g., Apache Kafka), consumers are notified as new entries get written to the log head. Consumers can keep reading these entries as the head changes. Pub-sub systems can scale throughput as producers and consumers scale by sharding or breaking the log into partitions and having different services/nodes responsible for individual partitions.

A distributed log also features fault tolerance, meaning that a loss of a node will not result in data loss, and that the system can eventually be made available (live) again. In order to build any fault tolerant and highly available system, a consensus algorithm is required. For distributed computing, the Paxos (or Raft) family of protocols may be used as a consensus algorithm. In such a consensus algorithm, different clients propose commands to the leader of the consensus engine, and the leader chooses the commands for each log slot. Once the leader dies, a new leader is chosen among the surviving nodes by the consensus protocol. The log is replicated by the leader to all the followers and the protocol ensures that no committed entries are lost when the new leader takes over.

In multi-Paxos/Raft systems, the log is also used for membership changes, such as if the system is changed from say nodes 1, 2, 3 to nodes 1, 2, 3, 4, for example. This change is added as a log entry to the same log itself. This ensures that the configuration change is ordered with respect to writes. In an embodiment, the distributed log 112 essentially implements a multi-Paxos protocol with each part of the log separated by a configuration change log entry. Basically, the configurable change log entries divide the log into different parts and each part belonging to a different configuration. This technique is called horizontal reconfiguration in multi-Paxos. Alternatively, a vertical reconfiguration may be used, where the configuration change is not in the log but done by auxiliary configuration master that facilitates agreement on the reconfiguration. In an embodiment, a data element referred to as a metastore is used as the reconfiguration master, so the log is divided into parts and each part has a different configuration done by the reconfiguration master.

Figure 4:
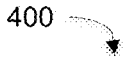
FIG. 4 illustrates the components of distributed log stack, under some embodiments.

FIG. 4 illustrates the components of distributed log stack, under some embodiments. System 400 of FIG. 4 shows an example system comprising three nodes denoted Node 1, Node 2, and Node 3. Each node has a respective client 402 that can be an application or pod micro service (e.g., DD service). Each client has an associated distributed log client library 404 that can communication with any of the log servers 406 denoted Log Server 1, Log Server 2, and Log Server 3 in the same or other nodes.

As shown in FIG. 4, each log is stored in a respective data blob 405 in the corresponding client library. The client library 404 maps the logs to their locations in storage. Each log is also mapped to a log client library component called a sequencer 412. The structure and function of the sequencer is described in greater detail with respect to FIG. 5 below.

For the example of FIG. 4, the DD service in Node 1 has log 1 and log 2 mapped to data locations in its respective client library, the DD service in Node 2 has log 3 and log 4 mapped to data locations in its respective client library, and the DD service in Node 3 has log 5 and log 6 mapped to data locations in its respective client library. The metastore 410 thus tells where the data is located for a particular log (e.g., Log 1). This mapping is used to indicate where multiple copies (replicas) of a log are stored, as the log data can be stored on any practical number of nodes for loss prevention. This also allows the metastore to indicate where an optimum log copy can be stored. The client libraries then directly access the nodes to write this information, as shown in FIG. 4.

In an embodiment, the distributed log uses NVMe SSDs 408 (or similar devices) for storage in each node. Each node contributes storage towards a pool, and all log storage is pooled together to form the storage pool. The metastore data element 410 is used to maintain this information. The log server 406 running in each node is responsible for writing/reading from local storage on the respective node. The metastore 410 is a key value store that uses a stateless service and transaction support feature (e.g., etcd) as a backing storage for storing per node storage information and mapping of logs to their locations in storage. As shown in FIG. 4, the metastore 410 uses etcd as the key value store that stores the mappings. Other similar mechanisms to etcd may be used, however.

The NVMe SSD 408 is used to store the segments in partitions 416. This segmenting is done by the respective log servers 406, as shown in FIG. 4 where log server 1 stores logs in segments of node 1, log server 2 stores logs in segments of node 2, and log server 3 stores logs in segments of node 3. The logs (e.g., Log 1 Log 2 Log 3), to which the clients write can contain any type of data and may reside on adjoining segments 416 in NVME 408.

System 400 also supports tiering of old segments to object storage, such as Object Scale 414, or any similar storage. This is shown in FIG. 4 where certain logs (e.g., those in node 3) are tiered to other storage, such as object storage 414. This tiering is needed to avoid garbage collection and its impact on SSD endurance, as described further below with respect to a truncate workflow. Although shown as resident in Node 1, the metastore 410 is a Kubernetes pods that can be running on any node, with one metastore per domain, where a domain comprises any appropriate number of nodes (e.g., 3 or 6 nodes, etc.).

Upon cluster startup, the metastore 410 is started, followed by log servers 406 and then the clients 402 can connect to it.

In an embodiment, the distributed log consists of the three main logical layers, a log layer, a segment set layer, and a storage layer. The log layer manages user logs, the segment set layer manages segment sets that the logs are stored in, and the storage layer is a per node layer responsible for local storage management of the segments. The storage units are optimally picked from the same availability zone for the segment sets to ensure that if there are more than FTT number of failures, the affected data is contained within the availability zone.

The distributed log exposes a simple log interface to the client, allowing them to open, write (append), read, close, and delete individual logs or all logs. The client library also has a set of sequencers that generate sequence numbers for writes to the logs.

Logs comprise records, which constitute the information about an event, I/O process, or other relevant system information. Through a client 402, a user can open a log with a log name. Every log name is required to be cluster-wide unique. Users can either create unique log names or they can be system provided. Each log can have only a single writer. Once a user opens the log, they can append a blob of data to the log as it is stored in the client library 404.

Figure 5:
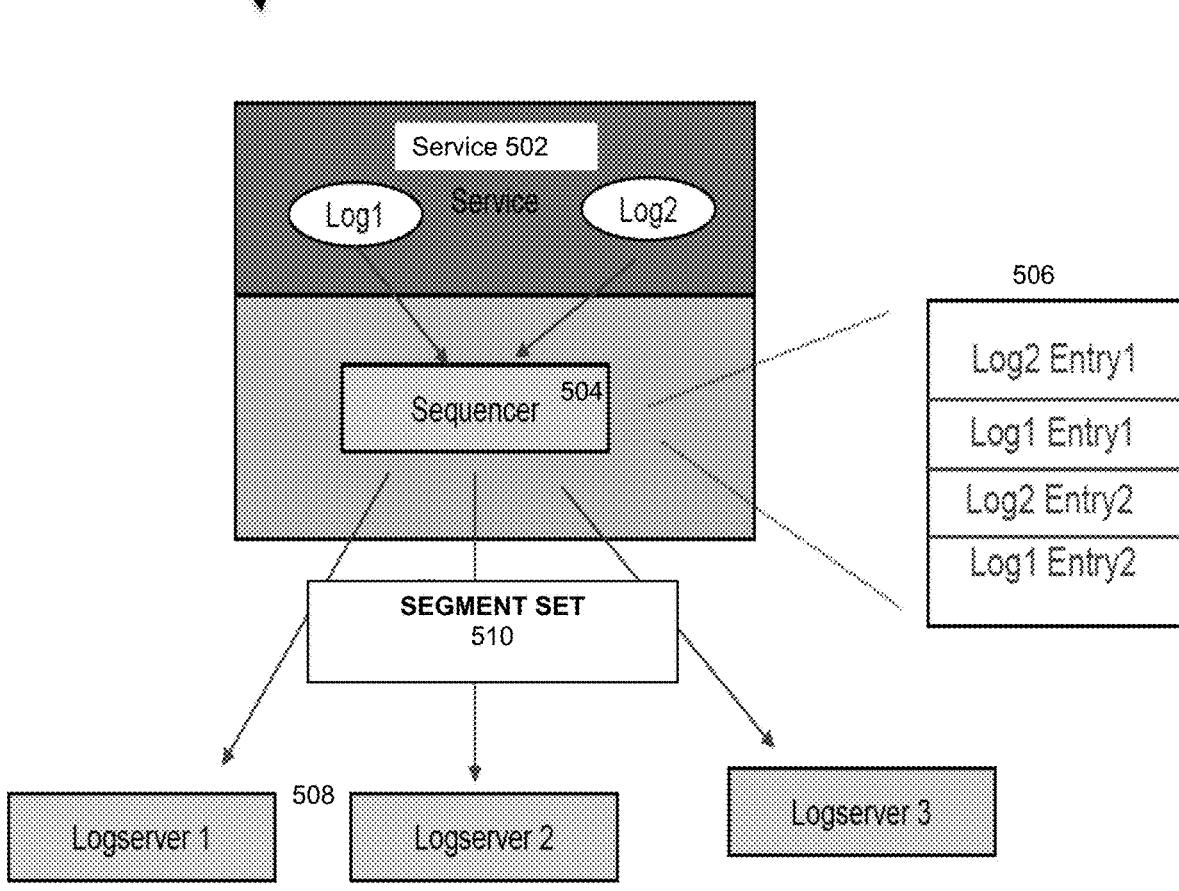
FIG. 5 illustrates the operations of the sequencer in FIG. 4, under some embodiments.

FIG. 5 illustrates the operations of the sequencer in FIG. 4, under some embodiments. FIG. 5 shows an example system in which a service 502 produces two logs denoted Log 1 and Log 2. Each log contains a number of entries that are denoted by a respective log and entry number, such as shown for example logs 506. The logs are sequenced by sequencer 504, which is part of the client library and serves to sequence all client entries that it receives. For the example of FIG. 5, the logs may be sequenced in the illustrated order of Log 2/Entry 1, Log 1/Entry 1, Log 2/Entry 2, Log 1/Entry 2, and so on, or any other appropriate order and composition.

The logs are mapped onto a segment set 510 in the segment set layer. A segment set is a F+1 copies of the segment on F+1 nodes to handle F failures. Segments are stored on NVMe SSDs in the storage layer as an immutable blob on disk or memory device. In an embodiment, a segment can be implemented as a 1 GB (configurable) file on an XFS filesystem to provide the required durability.

The logs are segment by the respective log servers 508, such as Logserver 1, Logserver 2, and Logserver 3.

The log moves from one segment set to next to grow the log. Moving from one segment set to the next requires a configuration change and sealing protocol, which, in an embodiment, can be a variant of Paxos called Stoppable Paxos. Since a log can be mapped to any of the segments in the pool, the system can load balance the data across all available log servers. A replica hosted on a log server that is slow or fails (due to planned, unplanned, temporary or permanent causes), can be redirected to a different log server almost instantly. The client writes will go to the new log server with minimum disruption. This allows for high availability even in the case of node/service failures. In the background, the system to automatically re-balance replicas to restore fault tolerance and availability for client data.

With this combination of replication and distribution, the system obviates size restrictions on logs and allows for flexibility in that either a single log can grow linearly, or one many logs can be added, which scale with the increase in compute and storage with the addition of log servers.

There are two use-cases of distributed log. One is NVRAM use-case where the system replaces its NVRAM with the distributed log on NVMe SSDs, 408 and the second is the key value store on object storage which uses distributed log for persistence.

With respect to the NVRAM use case, DDFS uses NVRAM as a transaction log for namespace and file management. The client uses the NVRAM as fast persistent memory to avoid writing to slow disks and reduce latency in the write path. In a Santorini network, only a log interface can be provided, and not a fast persistent memory interface. In order to get around the problem of mapping a memory interface to a log interface, DDFS can write to many logs in parallel, but they need to manage append/truncate of their logs.

KVS on object storage uses the distributed log for persisting metadata. KVS on object storage is a modified RocksDB that is a LSM tree which buffers writes in memory and then does bulk writes to storage. So writing to RocksDB would only write to local memory, and the system needs to persist those writes until the database has flushed them to storage. In this case, the distributed log is used for persisting those writes. When the client does a put of a key value written to a table mapped to KVS on object storage, the writes are persisted in log and written to RocksDB in memory. When the database writes the entries to storage, the log is truncated.

Figure 6:
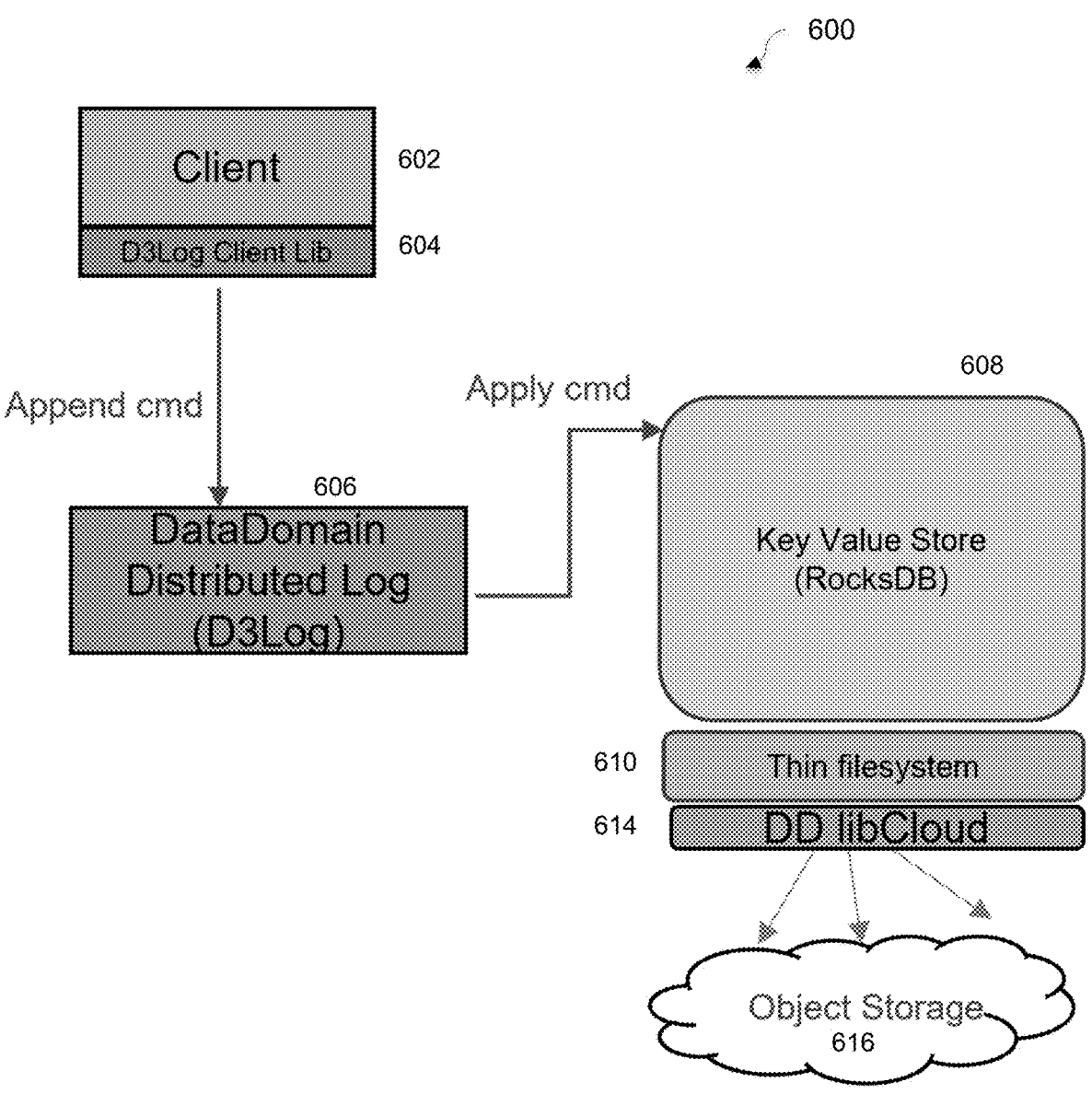
FIG. 6 shows how the distributed log is used in a key value store on object storage, under some embodiments.

FIG. 6 shows how the distributed log is used in a key value store on object storage, under some embodiments. As shown in system 600, a client 602 writes a key/value pair to the log client library 604, which is then persisted in the distributed log 606. The key/value is then applied to the KVS (e.g., RocksDB) 608 on object storage 616 through a thin filesystem 610 and appropriate cloud library 614. It should be noted that only one of the F+1 log servers will apply the log entry to KVS on object storage 616. To decide which of these log servers write to KVS, the system uses the metastore 410 to elect the leader for the writer. For each segment, it will elect the leader that is responsible for writing this to KVS 608 on object storage 616. If the leader dies, then other F nodes will elect a new leader using the metastore and continue from there. It should further be noted that the writes to KVS object storage are only written synchronously to an in-memory data structure. Once the data in KVS on object storage is flushed (as happens in the background) to object storage (persistent storage), the distributed log 606 is truncated.

In an embodiment, each client library has a set of sequencers (or sequencer objects) which are responsible for providing a sequence number to each log entry. Each sequencer object has a sequencer ID which is unique across the log and assigned using the metastore. When the log is opened, the client library sends a request for a log to sequencer assignment from the metastore. The metastore then assigns the local sequencer for the log. In some implementations, the metastore may be configured to provide a remote sequencer for the log as well. Once a sequencer is assigned, all writes for that log go through that sequencer only. Each log can be mapped to only one sequencer in the entire cluster, and all reads and writes happen through that sequencer only. When the client dies or is partitioned out, the ownership of the log gets transferred to a different sequencer by a client recovery protocol.

The sequencer (object) assigns a sequence number per log. That sequence number is called the log sequence number (LSN). Each sequencer object is mapped to an open segment set. There are two kinds of sequence numbers: (1) LSN: a log sequence number that is specific to each log, and (2) SSN: a segment set sequence number specific to each segment set. An LSN identifies a log entry and is assigned per log in the context of client calling thread. An SSN that is assigned by the sequencer thread ensures that same log entry is present at same segment sequence number in the segment set. It is important to note that the same log entry can be present in different positions in different segments of the segment set but they have the same segment sequence number. The SSN is also used for deduplication of log entries between the client and the server. The server can check if an SSN has already been written to the segment or not. If so, then it can avoid applying the entry again.

Embodiments also implement a quorum, which would be a minimum number of copies needed to provide failure tolerance in a Failure to Tolerate (FTT) environment. For example, for a Santorini network, FTT=1 for 3 node cluster, and FTT=2 for a cluster of 5 or more. To handle FTT=2 or F failures, the distributed log will make F+1 copies. This F+1 maps to commit quorum (C), Minimum number of replicas after which an entry is considered committed (C=2 to 3). This is the number of replicas for which the system will wait for an acknowledgement of the write. With respect to the quorum, the node set (N) is the set of nodes in the entire cluster (e.g., N=3 to 16), and the write quorum (W) is the number of replicas to write the log entries to (e.g., W=3). The read quorum (R) is the number of replicas from which entry must be read to be safe, and the recovery quorum (REC) is the minimum number of replicas to read from during recovery. When N=3 or N=4, the system will set W=3, C=2 and R=1. This means that a 3-node cluster can survive 1 node failure (FTT=1). When N=5, the system will set W=3, C=3 and R=1. This means that a 5-node cluster can survive two node failure (FTT=2). The recovery quorum is same as write quorum as all W copies need to be read during recovery. For the distributed log, the system only needs to write to three copies to maintain an FTT=2 on a cluster with five nodes or more. A cluster size of less than five will support FTT=1.

As mentioned above, the log layer exposes a log abstraction to the clients, where the log is a totally ordered, append only storage abstraction. A client can open the log and append to it or read from it. Clients can append variable sized blobs (such as up to 2 MB) to the log. The log layer appends a log sequence number (LSN) and a NTP based clock timestamp to every log entry, which can be useful for debugging.

The log layer exposes a single writer multi-reader semantics. The log is assigned to the process local sequencer object and can only be written by that sequencer object. The log maintains this property that if an entry at LSN X is committed, then every entry less than X is also committed. A commitment for an entry at LSN X implies that the entry is committed on F+1 SSDs on F+1 nodes.

The client maintains three types of LSNs. The first is called write_lsn which is added to every append. The second is local_commit_lsn returned per log server, and is the LSN returned by each server up to which that log server has locally committed (there will be F+1 values, one per F+1 servers). The third is global_commit_lsn, which is the minimum LSN up to which the log is globally committed. Each log entry that is globally committed is safe to read. Once the entry is globally committed, a success message is returned to the client.

Both write_lsn and global_commit_lsn are sent by the client as part of every remote procedure call (RPC) to the servers. Once the entry has been committed by F+1 nodes, each server sends a server specific local_commit_lsn. The client keeps the global_commit_lsn as minimum of the local_commit_lsn's sent by each log server and sends it as part of the next RPC to each log server responsible for current open segment set that the log entry is being written to. The global_commit_lsn lags the write_lsn and local_commit_lsn, and each log server maintains the local_commit_lsn and global_commit_lsn per log in the storage layer.

The segment set layer is responsible for segment set management, where a segment set 510 is a set of F+1 segments that the data is stored in. All segments in a segment set are identical in that they contain the same log entries. This layer provides the replication and fault tolerance by writing data to F+1 copies. This layer sits in the client and interacts with log servers and metastore. The segment set is provided by the metastore service from the pool of storage. The segment set layer has certain responsibilities. First, when the log layer wants to write a blob to a log, the segment set layer would map the log and its blob to the current open segments on F+1 different nodes. Second, the segment set layer would assign a segment sequence number (SSN) to every log entry. A log entry will have same SSN in all the F+1 segments that it is written to. Similar to the log LSN, segment LSN is sent and returned as part of every RPC call. Third, the segment set layer is responsible for getting F+1 segments on F+1 nodes by contacting the metastore. Fourth, once the segment set layer gets the segment set to write to, it will send the SSN assigned log entries to F+1 servers.

The segment set layer also seals the segment set once the segments become full (e.g., 1 GB). A seal operation makes the segment set immutable by setting a SEAL state for each segment in the segment set. The segment set layer in the client would perform following actions during this process: send a SEAL command to F+1 replicas, and once there is at least on successful SEAL reply, it gets the globally committed LSN from log layer for all logs and update the metastore with committed LSN per log and the globally committed SSN. Sealing means all the segments in the segment set are sealed. It also updates the metastore with the globally committed SSN and sets the state of the segment set to CLOSED. Finally, if a write fails to any node, the segment set layer is responsible for sealing the segment set to make all the segments identical and getting new segment set to continue.

A segment set is in one of three states: OPEN, IN_RE-COVERY and CLOSED. This state of the segment set is maintained in metastore. If a segment set is OPEN, then it is available for writing. If the segment set is in IN_RECOV-ERY state, it means that one or more of the segments is being currently recovered. If the segment set is CLOSED, it means that the segment is immutable and can only be deleted.

In the case of a crash recovery, the CLOSED state is also used to mark the segment closed for writing when it becomes full (each segment being around 1 GB). A CLOSED segment set can be moved to object storage if the system runs out of NVMe space. The segment set also has a location information in the metastore, which specifies where the segment set is (i.e., in NVMe SSD or object storage). The system only needs to write one segment in the segment set to object storage because object storage is itself fault-tolerant storage.

It should be noted that there is a N:1 mapping to a segment (where N is the number of logs). This means that many logs are multiplexed on the currently open segments. This makes the scaling of logs independent of the segments and decouples the log abstraction from the actual storage abstraction. In actual implementation, the system could keep maximum N as 1000 to handle the DD use-case.

Figure 7:
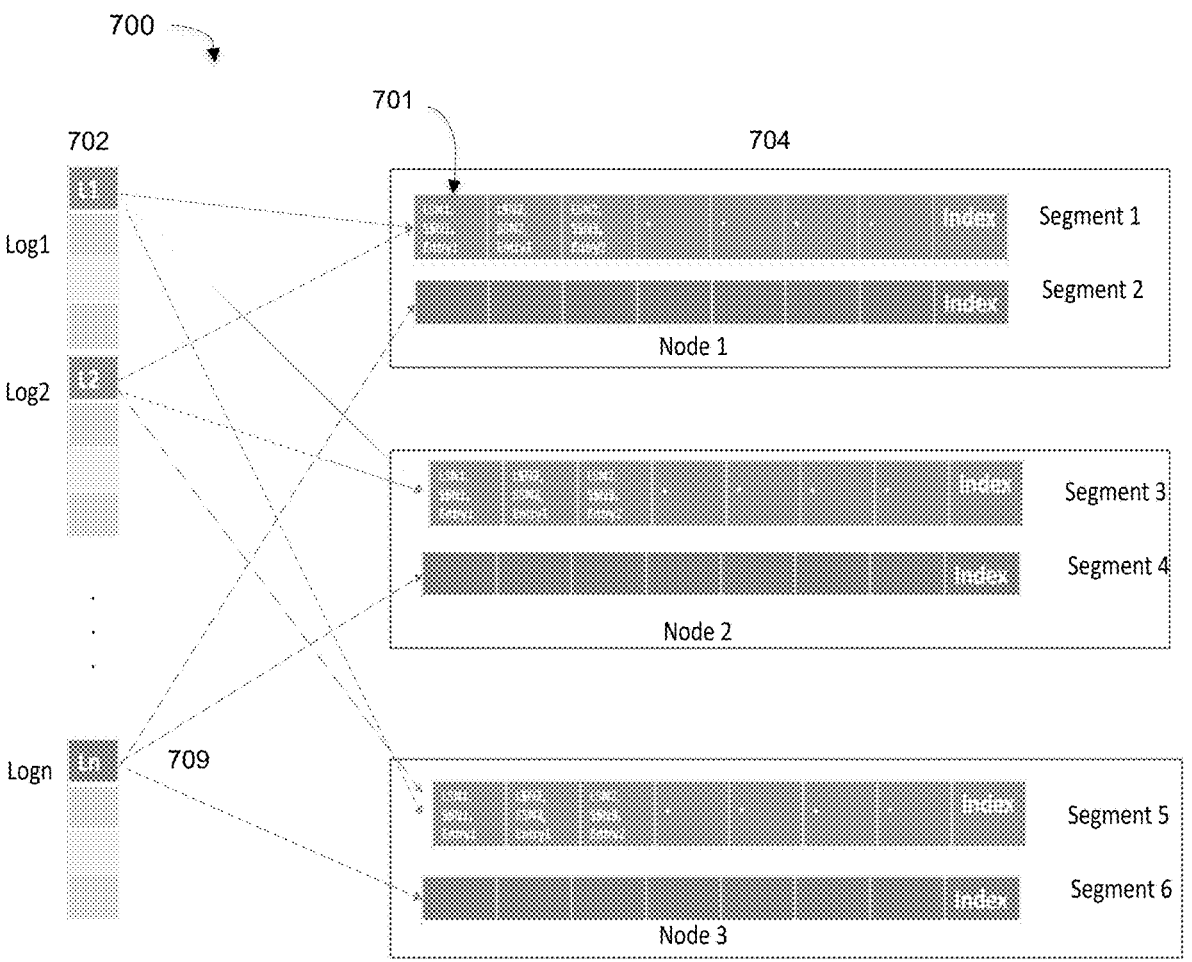
FIG. 7 illustrates how the logs are multiplexed onto a segment set layer, under some embodiments.

FIG. 7 illustrates how the logs are multiplexed onto a segment set layer, under some embodiments. The example 700 of FIG. 7 shows how certain logs 702 denoted Log 1, Log 2, to Log n, are mapped segments 704 stored in different nodes, such as Node 1, Node 2, and Node 3. As shown in FIG. 7, Log 1 and Log 2 are mapped to a segment set containing segments 1, 3 and 5 and the log entries for these logs are interspersed in these segments. The overall data structure 702 represents the mapping stored in the metastore to lookup any and all client logs as needed, and each index in the nodes refers to the mapping to describe the layout of the segment (e.g., size, ID of the different entries packed into any segment, etc.).

As shown in FIG. 7, Log 1 is denoted L1, and has in the index for Segment 1 a first entry 701, which is LSN1 and corresponds to Entry1 (the client data). The SSN1 indicates that this is Entry1 in Segment1 for the data blob on the NVMe of node 1. A copy (replica) of this data is in Segment3, which is a data blob on NVMEe of node 2.

For Log 2 (L2), the LSN2 SSN2 Entry1 would be the tail (or oldest entry) and a more or most recent entry, e.g., LSN2 SSN3 Entry2 would be the tail. Note that entries from the different logs could be interleaved. Here LSN2 entry1 and LSN2 entry2 are adjacent.

The index keeps a mapping of log and log's LSN to the position in the segment. FIG. 7 is provided for purposes of illustration, and a log entry may have more fields. This structure also allows log data of different types to be stored in each node.

In FIG. 7, the lines 709 emanating from Log n (Ln) represent an expansion of the logs to create indexes for segments 2, 4, and 6 when the log is expanded.

As shown for the embodiment of FIG. 7, a log consists of sequence of segments, and each segment is a file on NVMe SSD with size around 128 MB (or similar). Each segment belonging to a log is replicated to prevent single point of failures. All segments are pre-allocated files across the nodes, and each segment consists of blocks and where each block consists of sequence of entries, and each entry is a data blob written by the client.

FIG. 7 illustrates an example use of multiple sequencers and multiple logs. Using multiple sequencers allows for parallelism across clients and independent batching of writes. In this system, segment sets can have data from different logs at different positions within the segment. Note that a specific log entry, or specific LSN will have the same SSN on all segments of the set.

Using segments for logs and multiple sequencers allows for multiplexing of logs into segments. Multiple clients can simultaneously write multiple logs into the same segment, space permitting. This obviates the need for dedicating segments for logs or clients, thereby optimizing for space.

The combination of the LSNs and SSNs, such as shown in FIG. 7, allows the appends (writes) to be batched and written asynchronously providing the desired write performance needed for DDFS. High availability for client logs using a configurable dynamic quorum mechanism, as described above. Each log entry is replicated to 'n' segments ('n' is client configurable) and is referred to as write quorum. A commit quorum, C, is used to determine the minimum number of replicas to be written to consider an entry committed. Once the commit quorum is reached, a client ack can be issued. A read quorum, R, is the number of replicas that must be read for an entry to guarantee it is safe. A recovery quorum, REC, is required after a crash to determine the number of replicas to read for an entry during recovery (after a crash). In this embodiment, the dynamic quorum and therefore the FTT are configurable independently for each client log. This is achieved by using segments set configured for different FTTs (or replicas) and multiplexing client logs with similar FTT requirements.

The storage layer manages the physical segments on a node. The storage layer is a simple key value store for managing segments. A single node in a Santorini system typically has four NVMe SSDs. The storage layer maps segments (e.g., 1 GB in size) to one of the NVMe SSDs. One thing to note is that there will be a segment open per NVMe and the logs are multiplexed to the open segments on NVMe. For example, if there are four NVMe SSDs, there are four open segments on the node and logs are assigned to one of the open segments. This way the logs are divided onto currently open segments to maximize the throughput.

As shown in FIG. 7, a segment consists of a segment file and an index stored in a database. The segment has a metadata portion and data portion. The metadata portion contains the SEAL state of the segment among other metadata. Once a segment is sealed, it cannot be appended. The SEAL state of the segment is different from the states maintained for the segment in the metastore to indicate if the segment is OPEN, IN_RECOVERY or CLOSED. The seal state in segment metadata is used for fencing to ensure that there is a single writer for the segment. The state for a segment is used to check by the client library if the segment is open, closed or in recovery.

The segment's data portion consists of a sequence of segment entries. Each segment entry consists of <log id, log LSN, segment SSN, timestamp, log entry data>. The index stores the mapping of <log id, LSN> to . The index also stores <log id> to <globally_committed_lsn> mapping. This globally committed LSN is the minimum LSN that is safe to read. The last globally committed LSN per log is what is put in the metastore.

The storage layer is also responsible for tiering of a segment to object scale if it is running out of space. Only one copy of the segment will be tiered to object storage. Which segment in the segment set tiers can be decided by the client library itself. It can make an RPC call to one of the servers to tier to object storage and then update the metadata to change the location of segment set from SSD tier to object storage tier.

With reference back to FIG. 4, as shown, the distributed log system consists of clients 402, client library 404, log servers 406 for writing to storage, and a metastore 410 for metadata management of logs and segments. The log layer is present in the client library components 404, while the segment set layer is shared between the clients 402 and the log servers 406.

With respect to clients 402, the distributed log provides a simple API for interaction. This API allows the user to open a log with a log name (a new log will be created if it does not exist) and reserve space, get a cluster wide unique log name, get the log head and tail, append and batch append to a log, read a log, add more reserved space or remove reserved space from the log, and other similar operations.

A client library 404 is linked with every client process. The client library manages the log layer and segment set layer. The library works with the log servers 406 and the metastore 410 to map user logs to segment set with segments on different nodes. The client library keeps track of uncommitted entries per log and is responsible for sending the log entries to the current open segment set. When a segment gets full or a write fails to a node, it is responsible for contacting the metastore for a next segment or a replacement segment. The next segment can come from same node (if node is alive) or a different node (if node is dead). The client library also keeps track of write LSN, commit LSN and SSN and works with the log servers to ensure all writes are written to F+1 segments on F+1 different nodes. The client library is also responsible for crash recovery and sealing/fencing, in case the client dies and a new client takes over. The fencing logic guarantees a single writer for the log.

The metastore service 410 acts as a log controller and is responsible for metadata management for the distributed log. It maintains metadata for all logs tracked by the distributed log and uses etcd as the persistent store for the metadata. The metastore is a stateless service, and maintains (via etcd) the mapping of all segments available in the cluster to the log servers which hosts the segment. Upon startup (or restart) the metastore relies on the data in the transaction support feature to restore the state of the distributed logs. Log truncate operations are also processed by the metastore server. The metastore server is responsible for reallocating segments assigned to log servers that have failed, to segments on log servers with available segments. The metastore server triggers background resync operations to reestablish FTT of a distributed log, in the presence of log server failures or failures to writes to replicas due to other reasons. When a node is added to the cluster, the added node provides additional segments (backed by NVMe) to the metastore server for allocation to the client distributed logs. It is also responsible for collecting stats for different logs, and gets cluster membership notifications for node additions, deletions, etc.

The log servers 406 are responsible for reading and writing log data from and to the local storage layer. A log server is in the data path for client interactions, and is responsible for carving out segments on the NVMe storage, and providing this information to the metastore service. A log server writes data to segments, updates the metadata for these log entries, which includes computing checksums and adding them to the entries to protect against corruption. The log server responds to client requests for reading data from segments, by looking up the segment and returning the data once checksums are validated. It does not interpret any of the data written to the segments, the checksums protecting against corruption in the underlying storage. As noted earlier, the segments for a distributed log are replicated to more than one log server but the log servers do not communicate or exchange any data between each other in the write/read path. Only when needed to restore the fault tolerance due to node failure, do log servers communicate with each other. This allows scaling the number of log servers in the cluster without incurring any extra bandwidth issues.

FIG. 8 is a flowchart that illustrates a process flow for an append (write) workflow from a client, under some embodiments. As shown in FIG. 8, process 800 starts when a client opens a new log, at which point the distributed log opens a logical durable log and assigns a name that is unique across a defined cluster or domain, 802. The client can then append blobs of data to the log that is opened, and a sequencer object then assigns to each blob of data, referred to as log entry, a log sequence number (LSN) to uniquely identify the appended data, 804.

The sequencer object is mapped to an open segment set by the segment layer, 806. A segment set is a set of 'W' segments that come from different storage units for high availability, Note that the storage units for any segment set cannot span a domain (or availability zone). An open segment denotes a segment set that can be written to. The log entry associated with the LSN is replicated to the 'W' segments in the segment set and assigned a unique segment sequence number (SSN), 808. The value of 'W' is a client configurable value based on the fault tolerance desired.

Writes (appends) can be batched, and written independently and in parallel to the storage units, 810.

The log entry is persisted in the specified segments on durable storage units by the storage layer, 812 The storage layer is implemented as a key value store and the storage units are chosen based on the performance requirements.

Once persisted, the sequencer object mappings for the log entry, the LSN, SSN for the client log are updated in the meta store and the client receives an acknowledgment of the append, 814. An append with a particular LSN is acknowledged only after the entry for this LSN and entries for all LSNs preceding this have been persisted to all replicas in the segment set.

When a segment (and there the segment set) is full, the segment set is declared sealed (closed) and appends are directed to another auto-selected open segment set by the sequencer object, without client intervention, thus giving the impression of infinite space, 816.

Clients can trim logs dynamically up to specific entries when no longer needed, and the sequencer object reclaims the corresponding segment sets to the open pool of segment sets.

In the event of a system crash and restart, or if the workload is rebalanced to a different client), the system must read from previously written logs in order to restore DDFS to a consistent state. The sequencer object communicates with the meta store to identify the latest segment set associated with the affected logs, 818. The segment sets are marked for recovery and the latest consistent LSN across the segment sets is identified, 820. The client can the read the log entries to replay operations to restore file system consistency.

The segmented approach to implement a distributed log allows the distribution of writes across multiple storage units and optimizes write (append) performance. This can be applied to several different applications, such as fault isolation and fault tolerance, multiple segment allocation and compaction techniques, restoring consistency after crashes, and tiering of storage units, among others.

Figure 9:
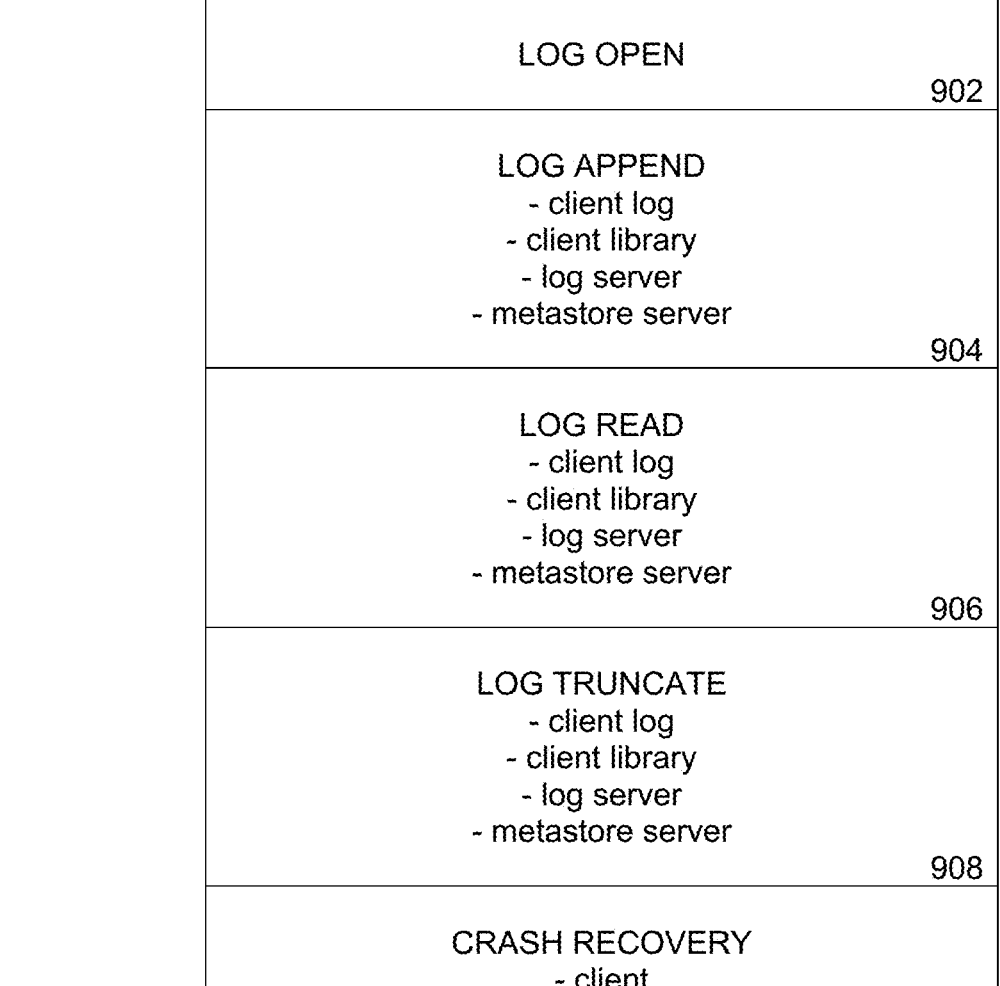
FIG. 9 is a table that lists certain operations impacting normal and crash recovery operations of a distributed log, under some embodiments.

Embodiments support certain operational scenarios involving some of the core paths of the distributed log. These implicate both normal operation and crash recovery paths. FIG. 9 is a table that lists certain operations impacting normal and crash recovery operations of a distributed log, under some embodiments.

As shown in FIG. 9, a first operation is log creation or log open 902. Opening a log with a log name will create a log if it does not exist. A call from client to the client library will result in client library asking the metastore if the log with a log name exists. If it does not exist, the metastore will create store log name, some metadata along and associate a unique log ID that is returned to the client library and the client. If the log already exists, this operation will do nothing and just return the unique log ID that was assigned to the log. The operation of creating a log in metastore is atomic and even if multiple clients try and create log with the same name, only one will succeed. Once a log is opened, the client can get a producer or consumer object on the log. A producer opens the log in the write mode and a consumer opens the log in read mode. The client will use the producer object to append to the log and consumer object to read from the log.

Once a log is created, it can be appended to by write operations 904. If the client appends the log, all the components of the distributed log (i.e., client log, client library, log server, and metastore server) are involved in the write path. At a high level, client writes go through one of the sequencers in the client library in the log layer and the segment set layer would write the log entry to F+1 open segments on F+1 log servers.

In 904, for client log append logic, the client calls append API provided by The distributed log client library to append a log entry blob to the log ID. This append can be synchronous or asynchronous. In case of asynchronous appends, the distributed log can call a callback once the write succeeded.

For the client library append logic, when the client appends an entry to a log (log ID) by calling append API, the client library would assign an LSN to the log entry and queue up the log entry to be processed by the sequencer responsible for the log ID. The LSN is assigned in the context of the client thread. If the append request is asynchronous, the request will be queued in the sequencer queue and returned to the client. Once the request is complete, there is a client callback. If the append request is synchronous, the request will be finished before returning to the client. The sequencer thread would reap the log entries from the sequencer queue and assign segment set SSN to it, and send the write to current open segment set for that sequencer. The sequencer thread sends the append entry to F+1 segments on F+1 nodes in parallel. A successful write to F+1 here guarantees that the write is committed on F+1 nodes and will not be lost. The writes on the server can happen out of order and in parallel. Each server keeps track of the minimum locally committed LSN and sends it back to the client. Client library would reply to the client for a successful write of an entry only when globally committed LSN crosses the write LSN of that entry. The client library also sends the globally committed log LSN to the F+1 segments to be stored in the segment's storage layer. The client library derives globally committed log LSN based on LSN received from F+1 copies as part of reply to RPCs from the log servers.

There are two key invariants that the client library maintains, first, the client library will return success to the client for a log entry only when it is globally committed to ensure that the log entry will not be lost, and second, for each globally committed LSN, all LSNs before it are also globally committed to ensure that all log entries are replied in order. To handle these two invariants, the client library maintains a queue per log of pending log entries (and which is different from sequencer queue) that have not yet been globally committed. The client library can return success to the client based on globally committed LSN. The log entry is only removed from the log queue once the LSN and all below LSNs are globally committed. This ensures that each log only waits for the ordering of its own log and other logs even though all the logs map to the same current open segment. This provides a way of multiplexing at the segment level even though the logs that map to those segments are in order.

For the log server append logic in 904, where the log server is a KVS for storing log data, as mentioned above, each log server receives the <log id, log write LSN, timestamp and segment SSN, current globally committed LSN, log entry data> from the log client which it appends to the open segment on that server that is specific to the sequencer. Once the entry is appended and committed with fsync/fdatasync, the system updates the index with two key value pairs:

key <log_id, write LSN> and value
  key <log_id> and value <current globally committed LSN>

Both these key values are written as batch of two key values to the RocksDB database, which batch supports atomicity so both key values can be updated atomically. At this point, the write is complete from local node point of view. It is possible that the segment gets full (1 GB) when the append is received, in which case, the log server will seal the segment and return segment full error to the client library. The RPC will also return the last LSN of all the logs that belong to the segment, along with last SSN. The client will write the last LSN, which would also be the last locally committed LSN for each log belonging to that segment to the metastore. This works as a checkpoint for all the logs per segment.

For the metastore server append logic in 904, where the metastore stores the metadata for the logs and the segments, when the client library asks for a new segment, the metastore sets the state of the segment to the OPEN state. Once the segment is either full or the client crashes, the segment state is changed to the SEAL state. The metastore writes the last committed LSN for each log and SSN to etcd on seal of each segment on F+1 nodes. When there is no crash, the client library calls metastore only when the segment is full and sealed. Otherwise, the metastore is not in the write path between client/client library and the log servers.

A next operation is a log read 906. The client log read logic issues a log read from a start LSN to end LSN. The start and end LSN can be the log tail (oldest entry written), and the log head (latest entry written) respectively. The distributed log provides APIs to get the log head and log tail.

For the client library log read, when the client library gets the read request, it would call the metastore to find out the segment set (F+1 copies) list that contain the data for the range read of that log. Once client library gets the segment set list, it can ask any segment for the read range as it is safe to read from any of them. The client library will call one of the servers (from the segment set) for each range read and the server will return the log entries.

When the log server gets a request to read the data for a log with range of LSNs, the server will iterate the index stored with that log segment and get the position of entries it needs to read and return the entry to the client. Note that it is safe to read a log entry only up-to globally committed LSN, so if the client is trying to read a log entry beyond the globally committed LSN, server will return an error and client library can retry after waiting. In system 100, this situation should not occur in the NVRAM use-case because NVRAM is only replayed during a crash.

For a log read 904, the metastore returns the list of segment sets that belong to the range of LSNs that the client is asking for. To get this information, metastore has cached this information and also persisted in etcd.

A log truncate 908 is another operation. The client truncate logic performs a truncate relative to log head or log tail. In a Santorini filesystem, either persists to distributed KV store or object storage, the client will call truncate for the log with the LSN as the input. In general, the truncate will mostly be done from the log tail, but where the log is corrupted at a particular LSN, it will truncate from that LSN up-to the globally committed LSN.

For the client library truncate logic, based on the LSN received from the client, the client library will issue a call to metastore to truncate the log. Truncating of log means simply updating the log tail to the LSN provided by the client. Once the log tail is updated, the client is so notified.

For the log server truncate logic, as part of the truncate call, data in logs segments need to be freed. On every log server, a background Garbage Collector service runs whose job is to either free the old segments or move old segments to object storage. This GC service performs the following steps: (1) check with metastore for all logs and their head/tail information, (2) walk index and remove the LSN up-to to log tail, (3) walk the segments from oldest to newest and check if the entire segment is live or dead and if the entire segment is dead, delete the segment, and (4) if running out of space on NVMe SSDs, tier the segment to object storage.

In an embodiment, there is no copy forward of live log entries from old segments. Either the whole segment dies, or the whole segment is moved to object storage. This is acceptable to limit the writes to SSDs and garbage collection causes unnecessary write amplification.

For the metastore truncate logic, the metastore is responsible for updating the log tail/head on the truncate call in etcd. It also keeps the write through cached copy of log head/tail.

Crash recovery and failure handling 910 is another important operation. For this operation, the distributed log has four components: client/client library, log servers, metastore, and etcd. Any of these components can fail or become network partitioned. The recovery process is dependent upon the component that failed.

If the Santorini filesystem client crashes, the client loses the in-memory state. In that case, the client needs to recover the data from distributed log. To perform this recovery, the client will issue a read of the current log head and tail and start reading from log tail to log head for every log, write the log entries to the distributed KV store or object storage and then truncate the distributed log.

For the client library logic and sealing protocol, since the client crashed, the client library running as part of the client also lost its state. The client library needs to perform its own recovery. There are two invariants that need to be held on client library recovery: first, any committed data should not be lost, and second, the client should be able to read the latest log entry successfully written by the client before it failed. Any data that was not committed can be removed by the distributed log.

The following are the steps in client recovery: (1) the client library gets the list of currently open segments from metastore, which are the segments for which recovery needs to be performed; (2) the client library sets the state of these segments to IN_RECOVERY to ensure that there are no parallel recoveries for these segments; (3) the client library sends a seal command to all currently open segments in the segment set, and the storage layer sets the sealing bit for all the logs belonging to that segment so that these logs cannot write to the sealed segment, and this will fence the older client in case of NW partition; (4) the client library performs the recovery by reading the highest LSN for each log from each of the F+1 open segments in the segment set; (5) for every log entry after globally committed LSN, the client keeps track of highest write LSN per log up to which all previous log entries are present in F+1 copies, the highest write LSN per log that is present in F+1 copies are the new log globally committed LSN per log, and the client writes the new per log globally committed LSN to the log servers, and (6) client calls CLOSED on the segment by updating the metastore to change the state of the segment from IN_RE-COVERY to CLOSED.

The above logic also handles client fencing for network partition. If the previous client is NW partitioned, the new client will start performing the above recovery process. Once the segment is sealed for the log set, the previous client will not be able to write to F+1 copies and get an error saying that the segment is sealed. In that case, the previous client has to kill itself.

With respect to the log server crash recovery in 910, if the log server crashes while the client library is writing to it, the client library will get an error and obtain a new segment from the metastore. The client library will then send that segment ID to the metastore and will ask for a replacement segment. The client will go through the same sealing protocol to SEAL the segment set and ask for a replacement segment set. As part of replacement, the metastore will provide a new segment set to the client to continue writing and metastore will CLOSE the open segments on the failed node.

The server can crash during append and can leave the segment or the index in the inconsistent state. During server startup, it needs to perform the recovery which would involve checking the last valid LSN entry per log in the segment by comparing the checksum of the entry stored against the calculated and then update the index with those log entries. As part of this recovery, there might be some entries which are in the segment but not in the index for that segment. The system gets the last globally committed LSN for every log from the index, checks the position of the LSNs in the segment, and reads all entries subsequent to that position for recovery. In reality, it can read the minimum globally committed LSN from all LSNs and read all entries subsequent to that during recovery.

If the log server does not come back up after a designated time window, metastore will remove the log server from the membership and trigger a rebuild process to restore the fault tolerance. In general, this should be rarely needed because the log entries in distributed log are short lived (until written to distributed KVS or object storage). So, upon triggering a rebuild, the logs and hence their corresponding segments might be dead already.

If a log server crashes and comes back up before the time window, it will check against metastore for the state of the segment it owns. If the metastore says that the segment set is CLOSED, the log server will set the state of all that segment to SEALED by setting per log sealed flag in the index and update the metastore with the last valid entry in that segment. In the case of a client library or client service crash, fault tolerance is provided through the quorum across replicas.

For the metastore crash recovery in 910, if the metastore service crashes, Kubernetes can restart it on any other node and/or the information can be restored from the etcd backing store. The metastore service is a stateless service that caches the state of distributed log system. The actual state is persisted in the etcd KVS. The metastore service also has its own fencing mechanism to ensure that there is only one metastore service even in case of network partition. It uses a generation number in the KVS to guarantee a single metastore service.

In the metastore, etcd is a fault tolerant system which itself maintains 2*F+1 copies on 2*F+1 nodes for handling F failures. If the network connection to the KVS is lost or loses quorum, then The distributed log will go down and hence the Santorini filesystem will go down.

Log migration 912 is another operation for system 100. In various scenarios, an individual or a set of logs can be migrated from one sequencer to another. This will happen when the client migrates log writer from one node other another, for example, when a different client takes ownership of the data being written to the distributed logging infrastructure, that client should write the log using the local sequencer. This log migration has to follow the same recovery/sealing protocol where it seals the log in the previous segment set and starts writing the log with the new sequencer on the new node with a new segment set.

FIG. 9 is provided for purposes of illustration and other operations can also be supported, based on system configuration and requirements.

With regard to additional features, the distributed log can be configured to support log namespaces for log space management and quotas and QoS in future. Users can create a namespace and put all the logs in the namespace. For each namespace, users can specify a space quota. All logs belonging to the namespace will share space from its namespace quota.

The metastore can also interface with membership services for new node additions and deletions. The log does not rely on membership service for notification of any of Santorini services dying or starting up, nor does it rely on Santorini fencing framework as it has its own fencing mechanism, as described above.

Santorini has an application orchestration service (AOS) that is responsible for orderly startup of Santorini services. The log services have to be started after the storage stack but before the DDFS stack is up. AOS will also inform the distributed log of all startup and shutdown events.

With regard to component upgrades, the log servers 406 can be updated using a combination of migrating segments off of the log servers and restarting them with new versions. The metastore server is stateless and can be restarted with the new version. Client library updates will require clients to call into the new dynamic linked library. Other functions can also be supported, based on system configuration and requirements.

The operations of FIG. 9 can support various different operational conditions. These are listed in table 950 of FIG. 10.

Figure 10:
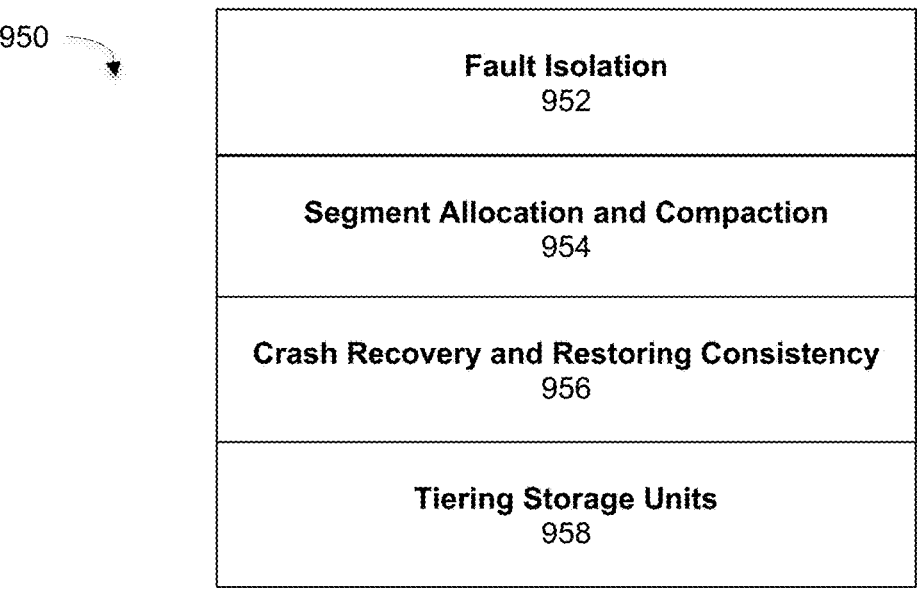
FIG. 10 is a table that lists certain features that are supported by the distributed log and operations of FIG. 9, under some embodiments.

As shown in FIG. 10, fault isolation 952 is a first application of the distributed log system. Failure of a storage unit only affects the replicas stored on that unit. Increasing the number of storage units correspondingly decreases the impact of append performance on any log due to storage unit failures. Storage units chosen for any segment set cannot span domains (or availability zones), for fault isolation and performance reasons Embodiments facilitate fault tolerance, automatic healing and load balancing. When a storage unit or a replica on that unit, becomes unavailable (due to any reason), the affected segments are automatically replaced by available segments from a different backing store. The newly added segment set is also automatically synchronized from an existing replica in the background providing automatic healing and restoration of fault tolerance. Segments in any segment set can be easily changed allowing for load balancing or migration of segments based on the storage unit or client requirements. Storage units chosen for any segment set cannot span domains (or availability zones), for fault isolation and performance reasons.

Fault tolerance is determined by the number of replica segments to which each client data is logged. For example, by having a segment set of 5, the client data (log entry/blob) has 5 copies on different nodes. The load balancing (during allocation of segments) is achieved by picking segment sets from different nodes based on many segments have been previously allocated, the type of NVMe storage and the profile of the clients using the segments. For example, if two clients are heavy users of segments, then the segment sets for their data will be allocated from different nodes. In the event of a node failure, the segments allocated will be redistributed to other nodes based on their load, segment availability.

With respect to multiple segment allocation techniques 954, Each sequencer object can employ a different methodology to associate a segment set to a log based on quality of service (QoS) or availability metrics. These methodologies range from size of the segments, number of replicas, and the backing store for the segments (e.g., Fast NVMe, slow HDD, cloud storage, etc.). The segment size determines how many segments can be pre-allocated to a client for low latency, such that a client never waits for a segment to write to. The number of replicas dictates the availability, and the backing store for segments determines how much performance a client needs.

The system 100 can also facilitate compaction of segments for space savings. Since logs are multiplexed into segments, and trimmed (truncated) independently at different times, space reclamation can be done by the independently by each of the log servers when predetermined thresholds are reached.

With respect to compaction, at any time, log servers have different numbers of allocated or in-use segments due to the fact that segment sets are constructed based on number of replicas and are load balanced. Clients provide information about when log entries (and therefore segment entries) are no longer needed, and this can occur at different rates with some faster than others. Log servers can act on these immediately or in batched manner based on their independent loads, space usage thresholds. This avoids issues like slowness in the system from all log servers running space reclamation at the same time.

An important application of the distributed log is in crash recovery and restoring consistency (healing) after system crashes, applications hangs, or similar events, 956. As with any distributed microservice, the distributed log system designed to recover from crashes or hangs automatically and restore consistency for all logs. When a client crash is detected, the logs for the client are sealed at the lowest LSN consistent across all replicas and any other writes from the crashed client are discarded. A new instance of the client, when identified can continue read writes for the same logs, and at a different generation or write new logs in the event of any crash recovered by process 956.

To guarantee consistency with no corruption and no loss of client data, if any of a client, log server or metastore fails, a recovery operation can be performed on the remaining impacted components to identify the last consistent writes on segment sets for every open log. Replicas are reconstructed as needed and global maps of the allocations are validated, without client intervention. A new instance of the client will get the consistent view of the entries it wrote in the log.

As mentioned earlier, mappings of entries of all logs, segments and storage units are tracked in the metastore. These mappings are held in memory and persisted using transactions to a key value store, that is independent of the functioning of the metastore. Crash consistency is guaranteed by the transaction model used to update mappings in the key value store.

For every entry written by a client to a log and replicated to the segment set, the mappings maintained include size of entry, location of entry in each segment, generation ID of the segment and checksums. In addition to storing these in segment maps on the log servers, the metastore stores a subset of the mappings in etcd. The combination of these two mappings in used to guarantee consistency when recovering from crashes any of the client, the log server or the metastore.

For tiering of storage units, 958, embodiments extend the endurance of storage units (e.g., for SSDs) by reducing garbage collection of deleted (or non-longer needed) segments, by tiering segments to cheaper storage based on configurable parameters. Segments that are full (or sealed), are migrated to erasure encoded storage units based on configurable time to live parameters. The erasure encoding allows the approach to eliminate replicas for segments while the time to live approach removes the need for expensive garbage collection of segments. Removing the need for garbage collection (or compaction of segments) reduces the additional overhead on the system, erroneous deletion of segments due to bugs in the software and extends the endurance of the storage units.

With respect to tiering, the metastore is configured to tier segments that have lived past a time threshold via time intervals and space usage parameters. The metastore triggers tiering by the log servers based on these thresholds. The logs servers write the selected segment to the tiered storage and update the data mapping in the metastore to indicate the new location of the segment. This update to the mapping also clears the previous segment allocation on the log servers. Using the mapping from the metastore allows the tiering to be done without loading all log servers.

Embodiments also facilitate a combination of tiering 958 and segment compaction 954. That is, both of these techniques to be implemented independently or together allowing for the appearance of unlimited log space for clients.

A combination of trimming and space reclamation based on information from the client, and tiering of older segments are used to reuse segments without running out of space. Clients that have short-lived data benefit from the trim on NVMe storage, while clients with long-lived data benefit from the tiering. These mechanisms are independent and the system can run both based on predetermined thresholds for space.

Embodiments of the processes and techniques described above can be implemented on any appropriate backup system operating environment or file system, or network server system. Such embodiments may include other or alternative data structures or definitions as needed or appropriate. The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 11:
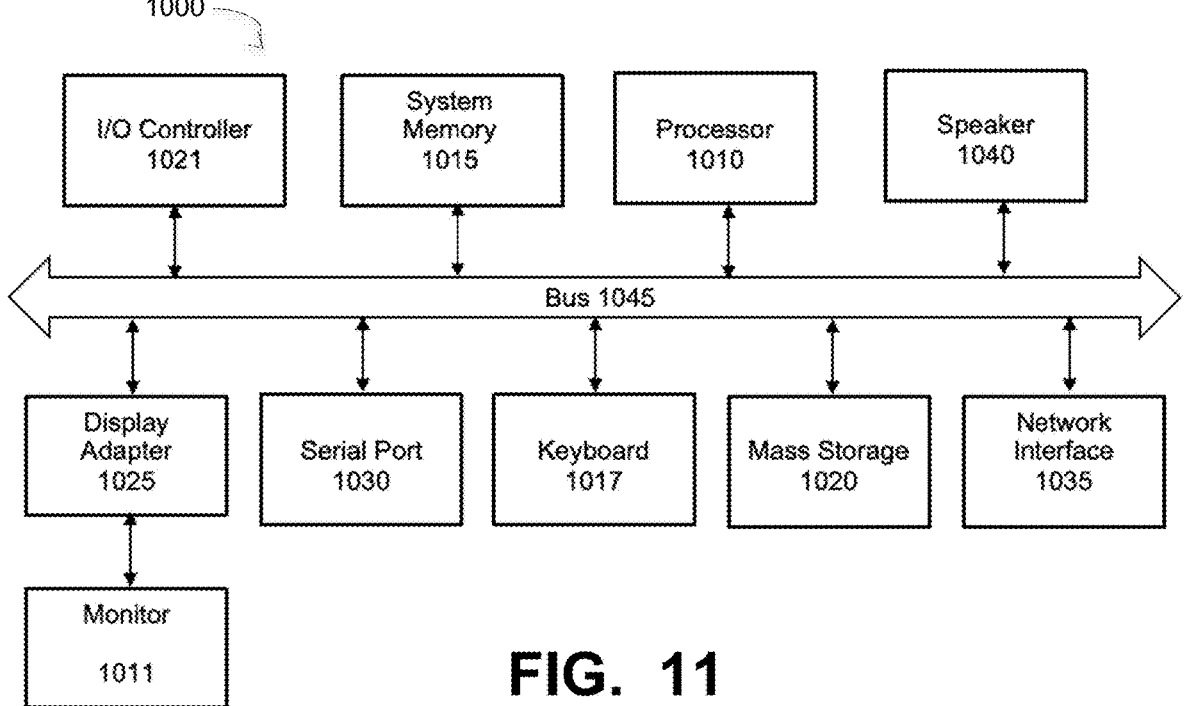
FIG. 11 is a block diagram of a computer system used to execute one or more software components for the distributed system of FIG. 1, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 11 is a block diagram of a computer system used to execute one or more software components of a logging and audit log generation processing component, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Embodiments can include computer-readable storage medium containing computer-readable instructions or computer program code. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/ recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/ LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of storing logs in a cluster system, comprising:

deploying a plurality of nodes in the cluster system;

maintaining, in each node, a respective client, an associated client library, a respective log server, and a respective storage device comprising non-volatile RAM devices;

opening, from each client, logs having record data stored as entries in the associated client library and that is routed to one or more log servers for storage in at least one of the respective storage devices;

storing the logs in a shared log structure that is segmented based on the logs and respective entries; and maintaining in one node of the plurality of nodes, a metastore containing a mapping of the logs with respective storage locations in the respective storage devices.

2. The method of claim 1 wherein the cluster system comprises a Santorini network processing containerized data utilizing a Kubernetes-based framework, and wherein the cluster system comprises part of a Data Domain deduplication backup system performing backup and restore operations for the nodes.

3. The method of claim 1 wherein the non-volatile RAM based storage comprises Non-Volatile Memory Express (NVMe) solid state disk (SSD) storage.

4. The method of claim 1 further comprising sequencing the logs in segment set that maps each log to a unique location in a segment, wherein each segment consists of blocks and each block consists of sequence of entries, and each entry comprises a data blob written by the client.

5. The method of claim 4 further comprising:
assigning a log sequence number (LSN) to uniquely identify a data blob comprising the log upon appending data to the log; and
assigning a segment set sequence number (SSN) to each segment in a log.

6. The method of claim 5 further comprising:
processing a client log write by appending new log segments to the log; and
issuing, from the associated client library an append to log servers on different nodes; and
committing, by the log servers, of a log entry to the log segments.

7. The method of claim 5 further comprising:
processing a log read operation upon restart of a client service;
issuing the log read operation by a client using a respective client library to read an appropriate log segment; and
performing the log read operation by a log server.

8. The method of claim 1 wherein the metastore determines an appropriate storage device based on node capacity for storing a presently processed log.

9. The method of claim 8 wherein the metastore is a stateless service, and maintains through a key value store (KVS), the mapping of all segments available in the cluster network to the log servers which host the segment.

10. The method of claim 1 further comprising truncating a segment to reclaim storage space when a predetermined space threshold is reached.

11. The method of claim 10 further comprising associating a segment set to the log based on at least one of quality of service or node availability metrics.

12. A method of maintaining a distributed log in a cluster system, comprising:
receiving logs generated by a plurality of nodes in the cluster system, wherein each log of the logs is processed by a respective log server that manages a data storage within a node;
processing the logs in a respective sequencer for each node of the plurality of nodes;
assigning a log sequence number (LSN) to uniquely identify a data blob comprising the log upon appending data to the log; and
assigning a segment set sequence number (SSN) to each segment in a log;

appending the logs to the distributed log by writing an entry to the distributed log from each log server; and
maintaining a metastore containing a mapping of the logs with respective storage locations in storage devices of the plurality of nodes.

13. The method of claim 12 wherein the cluster system comprises a Santorini network processing containerized data utilizing a Kubernetes-based framework, and wherein the cluster system comprises part of a Data Domain deduplication backup system performing backup and restore operations for the nodes and wherein the storage devices each comprise Non-Volatile Memory Express (NVMe) solid state disk (SSD) storage.

14. The method of claim 12 wherein the metastore determines an appropriate storage device based on node capacity for storing a presently processed log, and further wherein the metastore is a stateless service, and maintains through a key value store (KVS), the mapping of all segments available in the cluster network to the log servers that host a segment.

15. The method of claim 12 further comprising sequencing the logs in segment set that maps each log to a unique location in a segment, wherein each segment consists of blocks and each block consists of sequence of entries, and each entry comprises a data blob written by a respective client.

16. The method of claim 12 further comprising truncating a segment to reclaim storage space when a predetermined space threshold is reached.

17. The method of claim 16 further comprising, receiving from a client information about when log entries and resulting segments entries are no longer needed, and can be used for space reclamation.

18. A system storing logs in a cluster network, comprising:
a plurality of nodes deployed in the cluster network;
a computer hardware structure maintained in each node and comprising a respective client, an associated client library, a respective log server, and a respective storage device comprising non-volatile RAM devices;
a component opening, from each client, logs having record data stored as entries in the associated client library and that is routed to one or more log servers for storage in at least one of the respective storage devices;
a shared log structure maintained in storage and storing the logs in a shared log structure that is segmented based on the logs and respective entries; and
a metastore component maintaining in one node of the plurality of nodes, a mapping of the logs with respective storage locations in the respective storage devices.

19. The system of claim 18 wherein the cluster network comprises a Santorini network processing containerized data utilizing a Kubernetes-based framework, and wherein the cluster network comprises part of a Data Domain deduplication backup system performing backup and restore operations for the nodes, and further wherein the non-volatile RAM based storage comprises Non-Volatile Memory Express (NVMe) solid state disk (SSD) storage.

20. The system of claim 18 wherein the metastore determines an appropriate storage device based on node capacity for storing a presently processed log, and further wherein the metastore is a stateless service, and maintains through a key value store (KVS), the mapping of all segments available in the cluster network to the log servers which host the segment.

* * * * *